(No Model.)

F. H. C. MEY.
METALLIC BELTING.

No. 306,766. Patented Oct. 21, 1884.

WITNESSES
F. L. Ourand
Frank A. Fouts

INVENTOR
Fred. H. C. Mey.
By Michael J. Stark,
Attorney

UNITED STATES PATENT OFFICE.

FREDERIC H. C. MEY, OF BUFFALO, NEW YORK.

METALLIC BELTING.

SPECIFICATION forming part of Letters Patent No. 306,766, dated October 21, 1884.

Application filed March 19, 1884. (No model.)

*To all whom it may concern:*

Be it known that I, FREDERIC H. C. MEY, of Buffalo, in the county of Erie and State of New York, have invented certain new and useful Improvements on Drive-Chains; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in metallic belting for driving and other purposes; and it consists, essentially, in the novel and peculiar combination of parts and details of construction, as hereinafter first fully set forth and described, and then pointed out in the claims.

Figure 1:
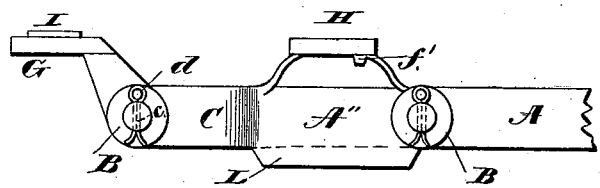
Figure 2:
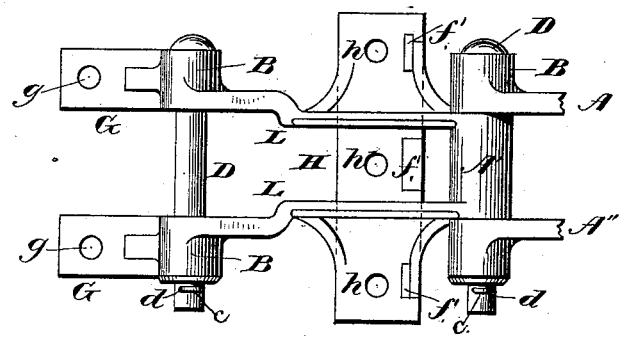
Figure 3:
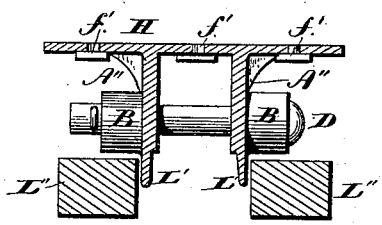

In the drawings already referred to, which serve to illustrate my said invention more fully and form a part of this specification, Figure 1 is a side elevation of my improved metallic belting. Fig. 2 is a plan view thereof, and Fig. 3 is a transverse section.

Like parts are designated by corresponding letters of reference in all the figures.

The object of my present invention is the production of a durable semi-detachable drive-chain for conveying power, elevating, and other similar purposes. To attain this end, I construct my drive-chain, essentially, of a series of links, A, of U shape. The cross-piece A' is preferably cylindrical in shape, while the parallel members of said link, A" A", are provided with outward offsets, C, and terminate in bosses B. The width of the said cross-piece A' is equal to the distance between the bosses B B, so that the head of one link may be passed between the branches or sides A" A" of any other link between the bosses B B, a bolt, D, being passed through the bosses and the head, in order to flexibly connect these several links together. In order to retain these bolts in proper position, I provide them with apertures c, into which I insert split pins d, so that by withdrawing said split pins I am enabled to remove the bolts (or any one or more of them) and thereby detach any one or more of the links A from the chain. The cross-piece or head of each link is preferably formed cylindrical in shape, and it serves, in addition to its forming an integral connection between the side pieces, A" A", as a means for propelling the belt or chain by means of a sprocket-wheel having sprockets entering the space between the parallel members A" A" of the link and moving the chain or belt by contact with either the back of one or the front of the next succeeding link, the direction of motion of the belt being governed by the direction of rotation of that sprocket-wheel which is the driving-wheel in the set.

On the bosses B, I form a tail-piece, G, having perforations g, through which rivets are passed to secure to said tail-pieces an elastic cushion, while I connect the parallel members B" B" by means of a cross-bar, H, having perforations h, through which bolts are passed to enable the fastening of an elevator-bucket to said cross-bar H.

On the under side of the cross-bar H, near the apertures h, I have formed projections f' for the bolt-heads to prevent the bolts from turning. This is quite an essential element in elevator-belting, because when in operative position there is usually no chance to get to the heads of the bolts to prevent them from turning while unscrewing or tightening the nuts.

The split pins d heretofore mentioned, after being inserted into the apertures c, are spread to prevent them from falling out of said apertures, and thereby the withdrawal of the pins D from the links. In this manner I have produced a semi-detachable link—that is to say, in contradistinction to a so-called "detachable" link—which may be removed from its counterpart or mate when in a certain position—a link, which although not detachable without previous preparations, may nevertheless be separated from its counterpart by removing the connection between the separate links.

It will be readily observed that my drive-chain is so simple in construction that it can be produced at nominal cost, especially so since all the parts entering into its construction can be produced in the process of casting without any subsequent manual labor.

In order to prevent the belting, when used for elevator purposes, from swaying sidewise, I form on the bucket-link guard-flanges L' L', Figs. 2 and 3, such flanges being adapted to run between the guard-rails L" L" of any elevator-leg, as shown in Fig. 3, said guard-flanges being cast integral with the side pieces, A″ A″, as well as the head A′, tail-pieces G, and the cross-bar H.

Having thus fully described my invention, I claim as new and desire to secure to me by Letters Patent of the United States—

1. The metallic belting consisting of a series of metallic U-shaped links, in combination with the rearwardly-extending tail-pieces G, pivoted to the free ends of the side bars, A″, of the link, substantially as specified.

2. A link for metallic belting consisting, essentially, of the head A′, the two parallel members A″ A″, having the offset C and bosses B, said members A″ being provided with the cross-bar H, connecting them on one side, and with projecting guards or flanges L on the opposite side, said bosses B having rearwardly-projecting parts G, and the whole being adapted for receiving an elevator-bucket, as and for the object specified.

In testimony that I claim the foregoing as my invention I have hereto set my hand in the presence of two subscribing witnesses.

FRED. H. C. MEY.

Attest:
MICHAEL J. STARK,
AL. STARK.